(12) United States Patent
Matsunaka et al.

(10) Patent No.: US 7,700,171 B2
(45) Date of Patent: Apr. 20, 2010

(54) TUBE-COATED BELT, HEAT FIXING APPARATUS, AND ORGANOPOLYSILOXANE ADHESIVE COMPOSITION

(75) Inventors: Katsuhisa Matsunaka, Shizuoka-ken (JP); Tomohira Kasumi, Kunitachi (JP); Kazuo Kishino, Yokohama (JP); Masaaki Takahashi, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 10/937,291

(22) Filed: Sep. 10, 2004

(65) Prior Publication Data

US 2005/0084690 A1 Apr. 21, 2005

(30) Foreign Application Priority Data

Sep. 19, 2003 (JP) .............................. 2003-328150

(51) Int. Cl.
B29D 22/00 (2006.01)
G03G 15/00 (2006.01)
G03G 15/20 (2006.01)

(52) U.S. Cl. ...................... 428/34.1; 219/216; 399/329; 524/262; 525/478

(58) Field of Classification Search ................ 428/34.1, 428/21; 399/329; 525/478; 524/262; 219/216
See application file for complete search history.

(56) References Cited

U.S. PATENT DOCUMENTS

| | | | | |
|---|---|---|---|---|
| 5,455,313 | A * | 10/1995 | Kurusu et al. ............... | 525/478 |
| 5,666,624 | A * | 9/1997 | Kanesawa et al. ........... | 399/329 |
| 6,433,057 | B1 * | 8/2002 | Bhagwagar et al. ......... | 524/403 |
| 6,564,033 | B2 * | 5/2003 | Zhou et al. ................... | 399/329 |
| 2003/0118927 | A1 * | 6/2003 | Nakamura et al. ........... | 430/65 |

FOREIGN PATENT DOCUMENTS

| | | |
|---|---|---|
| EP | 0 497 349 A2 | 8/1992 |
| JP | 7-53432 | 2/1995 |
| JP | 9-127816 | 5/1997 |
| JP | 2922712 | 4/1999 |
| JP | 2001-312169 | 11/2001 |
| JP | 3270489 | 1/2002 |
| JP | 2002-36361 | 2/2002 |
| JP | 2002-36383 | 2/2002 |
| JP | 2002-322363 | 11/2002 |

* cited by examiner

Primary Examiner—Brent T O'Hern
(74) Attorney, Agent, or Firm—Fitzpatrick, Cella, Harper & Scinto

(57) ABSTRACT

A tube-coated belt suited for heat fixation of color images and the like, downsizing and high-speed operation; and an organopolysiloxane adhesive composition of high adhesion durability suited for the manufacture of tube-coated belt, wherein the tube-coated belt has a resin tube on a silicone-rubber elastic layer through an adhesive layer, wherein the adhesive layer is composed of a cured product of an organopolysiloxane adhesive composition containing a specific organopolysiloxane component.

17 Claims, 3 Drawing Sheets

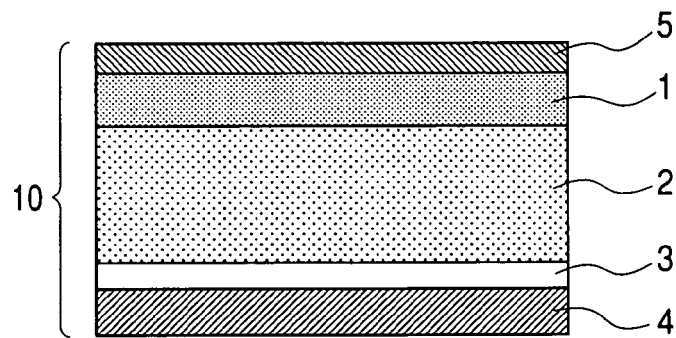
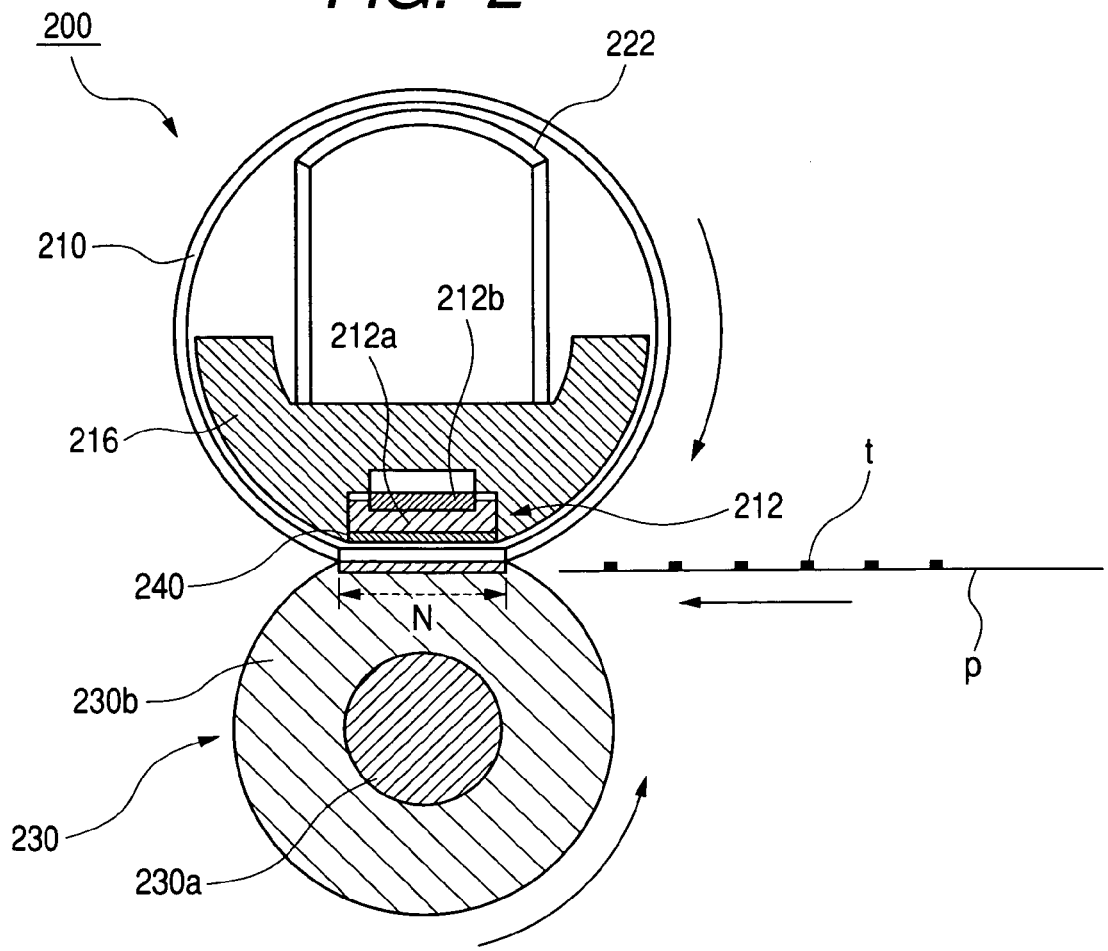

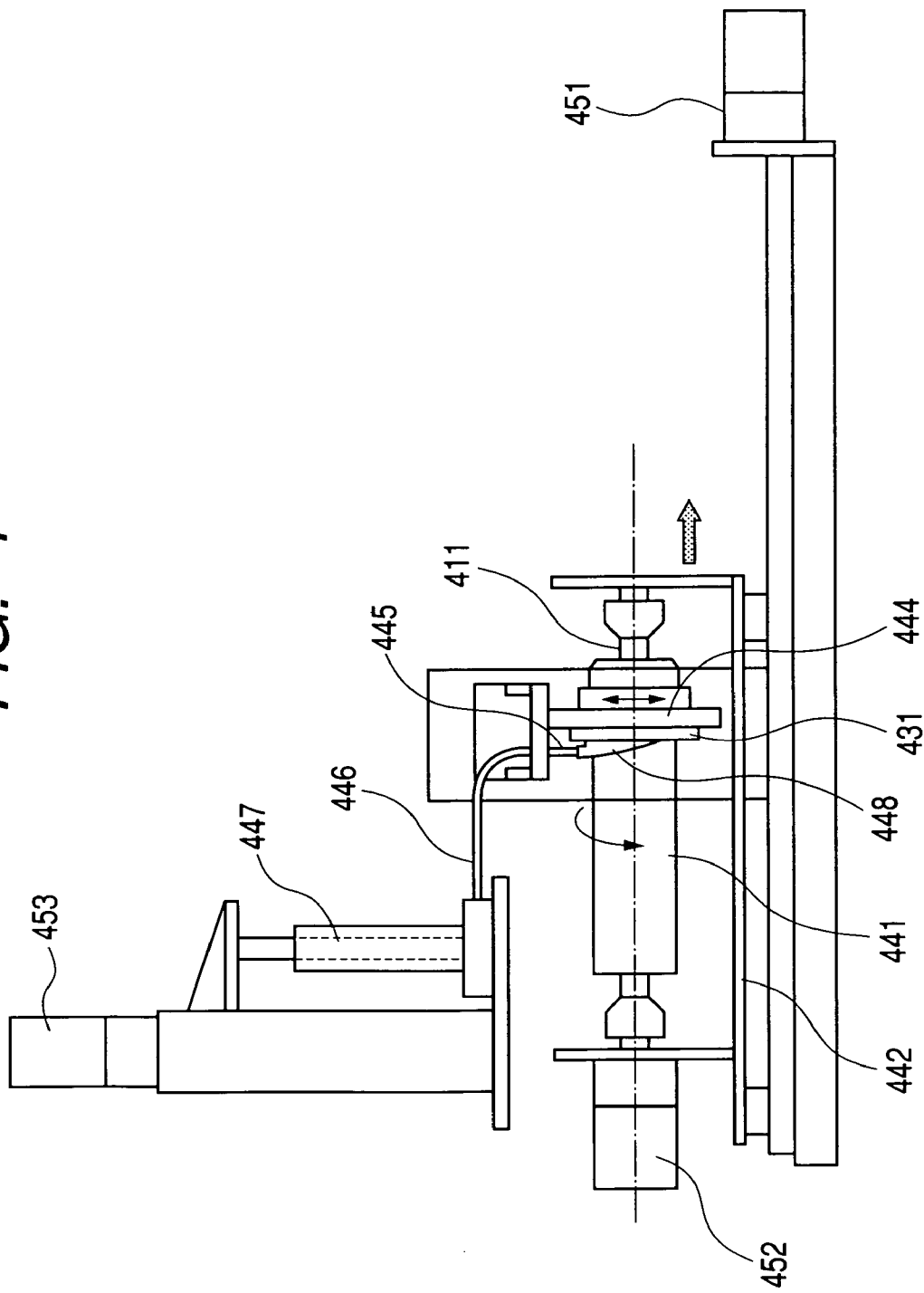

TUBE-COATED BELT, HEAT FIXING APPARATUS, AND ORGANOPOLYSILOXANE ADHESIVE COMPOSITION

BACKGROUND OF THE INVENTION

1. Field of the Invention

The present invention relates to a heat fixing apparatus used in toner-image forming apparatus, such as copying machines, printers and facsimiles; a tube-coated belt; and an adhesive composition that can be used for the manufacture of a tube-coated belt.

2. Related Background Art

In a heat fixing apparatus generally used in an electrophotography, rotating bodies, such as a pair of heated rollers and a roller, a film and a roller, and a belt and a roller, are pressure-contacted; and a recording material holding toner images before fixation is introduced into a pressure-contacted region formed between the rotating bodies, heated and fused, then cooled and solidified to form permanent images on the recording material.

The rotating bodies to which toner images before fixation held on a recording material contact are referred to as fixation members, and called a fixation roller, a fixation film or a fixation belt depending on their configurations. These fixation members are often formed of a single layer or multiple layers of heat resistant elastic bodies laminated on a base layer formed of a metal or a heat-resistant resin. The outermost layer of a fixation member is called a surface layer, and is formed of a silicone rubber, a fluorine rubber, a fluorine resin or the like. Among them, when a fluorine resin is used for the surface layer, an example of coating with a PFA tube is well known. A structure using a PFA tube through an adhesive layer as the surface layer has also been well known in the art, and a large number of the related techniques have been proposed.

For example, aiming at the surface softness and the thermal conductivity in continuous printing, a fixation roller using a core metal coated with a fluorine resin tube of a thickness of 30 to 50 μm through a silicone-based adhesive of a thickness of 50 to 170 μm has been disclosed (e.g., refer to Japanese Patent Application Laid-Open No. H09-127816).

For improving adhesion durability and elevating accuracy, a PFA tube-coated fixation roller having an elastic layer and an adhesive layer has been disclosed. The adhesive layer is composed of a self-adhesive silicone rubber of a thickness of 3 to 100 μm (e.g., refer to Japanese Patent Application Laid-Open No. 2001-312169).

In order to secure the evenness of adhesion and thickness of an elastic roller having a silicone elastic layer/adhesive layer/fluorine resin coated layer structure, a roller having an adhesive layer formed of a cured product of an additive silicone composition containing an organic silicon compound having selected functional groups, of a thickness of 0.1 to 0.3 mm, has been disclosed (e.g., refer to Japanese Patent Application Laid-Open No. H07-53432).

Furthermore, a method wherein a silicone-rubber layer is formed on a core metal, a self-adhesive silicone rubber, to which an acrylic or methacrylic functional silane coupling agent is added, is applied thereto, and a fluorine resin tube is thermally adhered thereon, has also been disclosed (e.g., refer to Japanese Patent No. 3270489).

In addition, there has also been disclosed a method for manufacturing a tube-coated fixation belt, wherein an additive silicone-rubber adhesive is previously intervened between a rubber-layer coated metal-based belt and a PFA tube, and the adhesive is spread from the outer surface of the tube using a squeezing ring to adjust the thickness of the adhesive layer to be thin (e.g., refer to Japanese Patent Applications Laid-Open No. 2002-36361 and No. 2002-36383).

It has been known that a heat fixing apparatus of a belt-fixation system has a belt-shaped fixation member facilitating to constitute a wide nip and to lower the thermal capacity of the fixation members, and is advantageous for speed raising, energy saving and downsizing of the heat-fixing apparatus. In other words, in order to pass a recording material holding toner images before fixation through the nip portion, and to heat and fuse, then cool and solidify the toner to form permanent images on the recording material, a sufficient quantity of heat must be supplied to the recording material and the toner in the nip portion. Therefore, in order to form permanent images, sufficient surface temperature of the fixation member, and retention time in the nip are required; and in order to achieve high speed, the nip width must be widened to secure a sufficient retention time in the nip.

In the case of the heat-roller fixing, although a method to increase the outer diameter of the roller is used to widen the nip width, this results in the enlargement of the apparatus. Whereas in the fixation apparatus of a belt-fixation system, since the fixation member is belt-shaped, a constitution that can easily secure a wide nip due to a high degree of freedom of shapes can be achieved. Specifically, the belt member is characterized in that a wide nip width to the same outer diameter can be secured compared with the roller member, and is advantageous for downsizing.

For methods of adhering a silicone rubber to a surface fluorine resin layer, adhesiveness and durability at high temperatures are required. A convenient method is the addition of a silane coupling agent in the silicone rubber to impart self-adhesiveness to the silicone rubber itself.

For example, there has been disclosed a method for adhering a fluorine resin tube on the silicone-rubber layer of an elastic roller, such as a fixation roller, wherein a self-adhesive silicone rubber containing an acrylic or methacrylic functional silane coupling agent is used (e.g., refer to Japanese Patent No. 2922712).

There has also been disclosed a method for improving the adhesiveness to a plastic material wherein a combination of an unsaturated-group-containing silane coupling agent and an epoxy-group-containing silane coupling agent is added to a silicone rubber, and an aluminum compound or a zirconium compound is further added thereto (e.g., refer to Japanese Patent No. 3270489).

On the other hand, as an additive silicone-rubber adhesive, an adhesive prepared by adding metal particles to an adhesive containing a resinous organopolysiloxane to control conductive properties has been disclosed (e.g., refer to Japanese Patent Application Laid-Open No. 2002-322363).

When an adhesive layer is formed between the elastic layer and the surface layer, since a roller-type fixation member is generally used without significant deformation, the adhesive layer little undergoes fatigue caused by deformation due to bending or the like, and maintains sufficient adhesiveness; however, since a belt-type fixation member is significantly deformed in operation, large stress is generated between the elastic layer and the surface layer due to bending, which cause a problem of adhesive durability.

Since commercially available silicone-rubber-based adhesives generally contain fillers such as reinforcing silica, they have high viscosities, and are difficult to apply to a thin layer, which cause a problem of poor workability.

Furthermore, in a heat fixing apparatus of a belt-fixation system oriented to downsizing and high-speed operation, since the adhesive layer used in a tube-coated fixation belt is subjected to extensive repetitive bending deformation in operation and easily undergoes fatigue, higher adhesive durability is required.

In a belt coated with a tube having a small diameter oriented to the downsizing of the heat fixing apparatus, the heat-supply time is inevitably short, and the manifestation of the heat supplied from the heat source on the surface of the fixation member delays. Therefore, the surface temperature in the second round is lower than in the first round, and the surface temperature in the third round is lower than in the second round. Thereby, the fixation ability at the leading end and the tailing end of a sheet of recording paper is remarkably lowered, and for example, unevenness of gloss on the recording paper occurs resulting in unsatisfied image quality. Therefore, higher thermal response is demanded. This problem becomes more significant at a process speed exceeding 100 mm/sec, which orients to higher speed.

SUMMARY OF THE INVENTION

Therefore, an object of the present invention is to provide a tube-coated belt that excels in bending durability.

Another object of the present invention is to provide a heat fixing apparatus equipped with a fixation belt that excels in thermal respond.

A further object of the present invention is to provide an organopolysiloxane adhesive composition having a high adhesion durability.

The present invention is a tube-coated belt comprising a base layer, a silicone-rubber elastic layer, a resin tube and an adhesive layer, the resin tube being adhered to the silicone-rubber elastic layer with the adhesive layer, wherein the adhesive layer is composed of a cured product of an organopolysiloxane adhesive composition comprising:

(A) two or more organopolysiloxanes having at least two alkenyl groups in a molecule, one of said organopolysiloxanes being a resinous organopolysiloxane represented by the general formula (I):

$$(R_3SiO_{1/2})_x(SiO_{4/2})_{1.0} \quad (I)$$

wherein R is a univalent hydrocarbon group, and X is a number between 0.65 and 1.9;

(B) an organopolysiloxane having at least two silicon-atom-bonding hydrogen atoms in a molecule;

(C) a platinum-based compound; and (D) an organic silicon compound having at least two functional groups selected from the group consisting of an end unsaturated group, an end epoxy group, a silicon-atom-bonding hydrogen atom and a silicon-atom-bonding alkoxy group in a molecule.

In the above-described tube-coated belt of the present invention, the content of the resinous organopolysiloxane represented by the general formula (I) is 30 parts by weight or more and 60 parts by weight or less when the content of the component (A) is preferably 100 parts by weight.

In the above-described tube-coated belt of the present invention, the organopolysiloxane adhesive composition has preferably a viscosity of 0.2 Pa·s or more and 5 Pa·s or less.

Further in the above-described tube-coated belt of the present invention, the silicone-rubber elastic layer preferably satisfies the following relational expression (1):

$$200\ (\mu m \cdot m \cdot K/W) \leq t1/\lambda 1 \leq 650\ (\mu m \cdot m \cdot K/W) \quad (1)$$

where t1 (μm) is the thickness of the silicone-rubber elastic layer, and λ1 (W/(m·K)) is the thermal conductivity of the silicone-rubber elastic layer; and the thickness of the adhesive layer t2 (μm) is 1 μm or more and 10 μm or less. The thermal conductivity is a value measured using a hot wire method, and W denotes watt, m denotes meter, and K denotes Kelvin.

The present invention is also a tube-coated fixation belt comprising a resin tube, a silicone-rubber elastic layer and an adhesive layer, the resin tube being adhered to the silicone-rubber elastic layer with the adhesive layer, wherein the silicone-rubber elastic layer satisfies the following relational expression (1):

$$200\ (\mu m \cdot m \cdot K/W) \leq t1/\lambda 1 \leq 650\ (\mu m \cdot m \cdot K/W) \quad (1)$$

where t1 (μm) is the thickness of the silicone-rubber elastic layer, and λ1 (W/(m·K)) is the thermal conductivity of the silicone-rubber elastic layer; and the thickness of the adhesive layer t2 (μm) is 1 μm or more and 10 μm or less.

In the above-described tube-coated belt of the present invention, the silicone-rubber elastic layer preferably satisfies the following relational expression (2):

$$200\ (\mu m \cdot m \cdot K/W) \leq t1/\lambda 1 \leq 420\ (\mu m \cdot m \cdot K/W) \quad (2)$$

In the above-described tube-coated belt of the present invention, the base layer on which the silicone-rubber elastic layer has been formed is preferably a metal belt having a thickness of 20 to 60 μm.

In the above-described tube-coated belt of the present invention, the thickness of the resin tube t3 (μm) is preferably 10 μm or more and 30 μm or less; and the thickness of the silicone-rubber elastic layer t1 (μm) is preferably 200 μm or more.

Further in the above-described tube-coated belt of the present invention, the base layer on which the silicone-rubber elastic layer has been formed is preferably an electroformed nickel belt.

Still in the above-described tube-coated belt of the present invention, the resin tube is preferably a PFA tube.

The present invention is also a heat-fixing apparatus that uses the tube-coated belt of the present invention as a fixation belt.

In the above-described heat-fixing apparatus of the present invention, the heat-fixing apparatus is preferably a heat-fixing apparatus that has a process speed exceeding 100 mm/sec, and the tube-coated belt has preferably an outer diameter of five times or less the nip width formed by the tube-coated belt.

Furthermore, the present invention, which achieves the above objects, is an organopolysiloxane adhesive composition comprising:

(A) two or more organopolysiloxanes having at least two alkenyl groups in a molecule, and at least one is a resinous organopolysiloxane represented by the general formula:

$$(R_3SiO_{1/2})_x(SiO_{4/2})_{1.0} \quad (I)$$

wherein R is a univalent hydrocarbon group, and X is a number between 0.65 and 1.9;

(B) an organopolysiloxane having at least two silicon-atom-bonding hydrogen atoms in a molecule;

(C) a platinum-based compound; and (D) an organic silicon compound having at least two functional groups selected from the group consisting of an end unsaturated group, an end epoxy group, a siliconatom-bonding hydrogen atom and a silicon-atom-bonding alkoxy group in a molecule.

In the above-described organopolysiloxane adhesive composition of the present invention, the content of the resinous organopolysiloxane represented by the general formula:

$$(R_3SiO_{1/2})_x(SiO_{4/2})_{1.0} \qquad (I)$$

wherein R is a univalent hydrocarbon group, and X is a number between 0.65 and 1.9, is preferably 30 parts by weight or more and 60 parts by weight or less when the content of the component (A) is 100 parts by weight.

Furthermore, the organopolysiloxane adhesive composition of the present invention has a viscosity preferably of 0.2 Pa·s or more and 5 Pa·s or less.

According to the present invention, there can be provided an organopolysiloxane adhesive composition that can form an adhesive layer having a sufficient adhesion durability in the idle-run test or the paper-passing durability test of the fixing apparatus conducted at high temperature, while maintaining viscosity workable when a silicone-rubber layer and a resin tube such as a fluorine resin tube are overlaid and adhered to the fixation belt used in a fixing apparatus using a belt.

In addition, by thinner adhesive layer formed by using an adhesive containing resinous organopolysiloxane, there can be provided a fixation belt suited for a heat-fixing apparatus, and a heat-fixing apparatus oriented to downsizing and high-speed operation that can improve the thermal response and adhesion durability of the tube-coated belt, and can suppress the gloss difference between the leading and tailing ends of recording paper caused by the delay of heat supply.

BRIEF DESCRIPTION OF THE DRAWINGS

FIG. 1 is a schematic diagram showing the layer constitution of a tube-coated belt according to an embodiment of the present invention;

FIG. 2 is a schematic constitutional diagram of a heat-fixing apparatus according to an embodiment of the present invention;

FIG. 4 is a schematic constitutional diagram of a ring-coating apparatus used in the manufacture of a tube-coated belt according to the embodiment.

DESCRIPTION OF THE PREFERRED EMBODIMENTS

Figure 3:
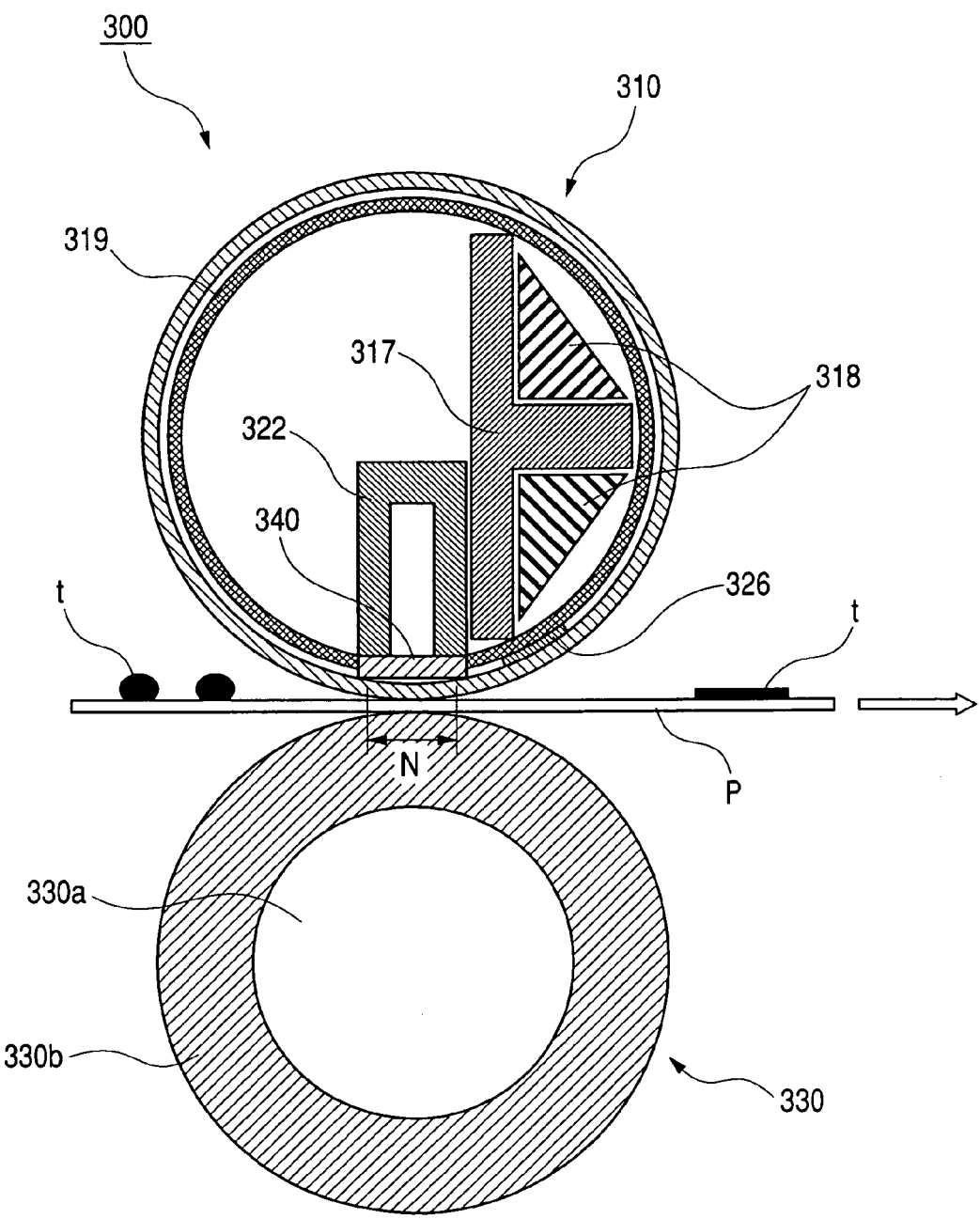
FIG. 3 is a schematic constitutional diagram of a heat-fixing apparatus according to another embodiment of the present invention.

First, the tube-coated belt of the present invention will be described. The tube-coated belt of the present invention is a tube-coated belt that has a silicone-rubber elastic layer on the outer surface of a belt-like base layer, and has a resin tube on the silicone-rubber elastic layer through an adhesive layer.

FIG. 1 shows a schematic diagram of the layer constitution of an example of the tube-coated belt according to an embodiment of the present invention. The tube-coated belt 10 of the present invention has a composite structure including a belt-like base layer 1, a silicone-rubber elastic layer 2 laminated of the outer surface of the belt-like base layer 1, a resin tube layer 4 coating the silicone-rubber elastic layer 2 through the adhesive layer 3, and if desired, a sliding layer 5 laminated on the inner surface of the belt-like base layer 1.

In the tube-coated belt 10 of the present invention, the sliding layer 5 is present on the inner surface side (belt guide side), and the resin tube layer 4 is present on the outer surface side (pressure roller side). A primer layer (not shown) for promoting adhesion may be laid between the belt-like base layer 1 and the silicone-rubber elastic layer 2, or between the belt-like base layer 1 and the sliding layer 5. The primer layer may be a known primer layer, such as silicone-based, epoxy-based and polyamideimide-based, and the thickness thereof may be about 1 to 10 μm.

The dimensions of the tube-coated belt are not specifically limited, but may be determined depending on the purpose of use. For example, when used in a heat-fixing apparatus, the tube-coated belt has the outer diameter preferably 5 times or more the width of the nip portion formed by contacting the tube-coated belt with the pressing member.

The tube-coated belt 10 of the present invention can be formed, for example, using the following method. First, a primer is previously applied evenly onto the outer surface of the belt-like base layer 1 and dried, and after the primer has been cured, a silicone-rubber material composition compounded so as to exhibit predetermined properties when cured is applied onto the primer layer so as to have a predetermined thickness, and heat-cured to form the silicone-rubber elastic layer 2.

The silicone-rubber elastic layer 2 can be formed using transfer molding using a pipe mold, coating, dipping or spraying, and the forming method is not specifically limited as long as surface flatness can be obtained.

When the silicone-rubber elastic layer 2 is formed using a forming method such as coating, dipping and spraying, a silicone-rubber material such as a liquid silicone-rubber material can be used as it is, or a solid material liquefied using a solvent such as toluene and xylene can also be used.

Next, the silicone-rubber elastic layer 2 is coated with a resin tube layer 4 whose inner surface is defluorinated having a predetermined thickness, and having an inner diameter substantially equal to the outer diameter of the belt-like base layer 1 having the silicone-rubber elastic layer 2. Simultaneously with the coating, an organopolysiloxane adhesive composition for forming the adhesive layer 3 is intervened. Specifically, after applying an organopolysiloxane adhesive composition for forming the adhesive layer 3 onto the silicone-rubber elastic layer 2, while holding an end of the resin tube layer 4 and supplying the organopolysiloxane adhesive composition for forming the adhesive layer 3 to the belt having the silicone-rubber elastic layer 2 from the coating starting side in the resin tube coating direction, the polymer tube layer 4 is coated using the lubricating action of the adhesive composition. At this time, when the viscosity of the organopolysiloxane adhesive composition for forming the adhesive layer 3 is within a predetermined range, a high workability can be obtained, and by squeezing the surface of the resin tube layer 4, the thickness of the organopolysiloxane adhesive composition for forming the adhesive layer 3 can be easily adjusted to be thin.

After thus applying the organopolysiloxane adhesive composition, it is heat-cured to form an adhesive layer 3 composed of the cured product of the organopolysiloxane adhesive composition to form the resin tube of the present invention.

On the inner surface side of the belt-like base layer 1 of the tube-coated belt of the present invention, a sliding layer 5 may be formed as desired. The sliding layer 5 may be formed before forming the silicone-rubber elastic layer 2, or may be formed after the outer surface of the silicone-rubber elastic layer 2 has been coated with the resin tube layer 4.

Next, the present invention will be described in further detail.

(Base Layer (Belt-Like Base Layer))

The tube-coated belt of the present invention comprises a belt-like base layer 1. The base layer 1 must possess high thermal conductivity that can transmit heat energy from a heat source installed therein to the silicone-rubber elastic layer 2, and flexibility as the fixation belt.

Specifically, the base layer 1 can be composed of a heat-resistant resin consisting mainly of polyimide or the like, a metal such as nickel, stainless steel and aluminum, and the alloy thereof, depending on the heating means in the heat-fixing apparatus or the like. Among others, an electroformed nickel belt formed using an electroforming method is known to have a high dimensional accuracy, and is suitable for the belt-like base layer of the fixation belt.

The electroformed nickel belt can be manufactured, for example, by immersing a columnar master block made of a stainless steel or the like in an electroforming bath, and growing on the surface of the master block using an electroforming process.

In order to reduce the heat capacity to improve quick-starting characteristics, the thickness of the base layer 1 is preferably 100 μm or less, more preferably 60 μor less. It is normally preferable that the thickness of the base layer 1 is 20 μm or more. When the thickness of the base layer 1 is 20 μm or more, the mechanical strength as the tube-coated belt becomes satisfactory, and when it is 100 μm or less, the flexibility as the tube-coated belt is sufficient and preferable.

(Silicone-Rubber Elastic Layer)

In the present invention, the silicone-rubber elastic layer 2 covers toner images held on the recording material in the nip portion to ensure that heat is transmitted to the toner images, and complements the restoring force of the belt-like base layer to relax fatigue due to rotation and bending. The silicone-rubber elastic layer 2 elevates the compliance to the surface of unfixed toner images on the surface of the tube-coated belt, and efficiently transmits heat to the toner images. Particularly, the silicone-rubber elastic layer 2 is an essential component for obtaining good heat-fixed images for color images carrying a large quantity of unfixed toners.

Since moderate flexibility is required in order to obtain high-quality fixed images, for example, when a resin layer is formed on the silicone-rubber elastic layer 2 using a PFA tube as the resin tube, the thickness t1 of the silicone-rubber elastic layer 2 is preferably 100 μm or more, more preferably 200 μm or more, and preferably 500 μm or less. When the thickness t1 of the silicone-rubber elastic layer 2 is 100 μm or more, the apparent surface hardness of the tube-coated belt is lowered and the surface of the tube-coated belt excels in flexibility. When the thickness t1 of the silicone-rubber elastic layer 2 is 500 μm or less, the thermal capacity of the tube-coated belt can be reduced to be suitable for the fixation belt for the heat-fixing apparatus oriented to energy saving and the reduction of warming-up time.

When color images are printed, it has been known that high-quality images can be printed if the toner is enwrapped with the surface of the tube-coated belt (known as the enwrapping effect). Especially in photographic images or the like, a solid image may be formed over a large area on a recording material P. In this case, if the heating surface of the tube-coated belt (resin tube layer 4) cannot follow the irregularity of the recording material or the toner layer, heating becomes uneven, and difference in the gloss of images between the portions of large heat transmission and small heat transmission occurs (gloss is higher in the portion of larger transmission, and is lower in the portion of smaller transmission), producing defective images due to uneven gloss. If the silicone-rubber elastic layer 2 is excessively thin, it cannot follow the irregularity of the recording material or the toner layer, uneven gloss of images occur, and defective images may be produced. On the other hand, if the silicone-rubber elastic layer 2 is excessively thick, the thermal resistance of the silicone-rubber elastic layer 2 rises, and the realization of quick starting may become difficult.

The hardness of the silicone-rubber elastic layer 2 (JIS-A) is preferably 70° or below in order to follow the irregularity of the recording material or the toner images and to obtain high-quality fixed images.

When the thickness of the silicone-rubber elastic layer 2 is t1 (μm) and the thermal conductivity of the silicone-rubber elastic layer 2 is $\lambda 1$ (W/(m·K)), it is preferable that the silicone-rubber elastic layer of the present invention satisfies the following relational expression (1):

$$200 \ (\mu m \cdot m \cdot K/W) \leq t1/\lambda 1 \leq 650 \ (\mu m \cdot m \cdot K/W) \quad (1)$$

It is more preferable that the silicone-rubber elastic layer of the present invention satisfies the following relational expression (2):

$$200 \ (\mu m \cdot m \cdot K/W) \leq t1/\lambda 1 \leq 420 \ (\mu m \cdot m \cdot K/W) \quad (2)$$

In general, the hardness of a silicone-rubber elastic layer having a high thermal conductivity is high, and if the value of $t1/\lambda 1$ is 200 (μm·m·K/W) or larger, the hardness of the silicone-rubber elastic layer 2 is lowered, and the surface flexibility of the silicone-rubber elastic layer 2 is raised and improving the image quality. On the other hand, if the value of $t1/\lambda 1$ is 650 (μm·m·K/W) or smaller, the thermal resistance of the elastic layer lowers, and the quantity of heat energy supplied to the adhesive layer can be made sufficient.

In order to make the silicone-rubber elastic layer 2 satisfy the above relational expression (1) or (2), the thermal conductivity $\lambda 1$ of the silicone-rubber elastic layer 2 is preferably 0.4 (W/m·K) or larger, and more preferably 0.6 (W/m·K) or larger. On the other hand, the thermal conductivity $\lambda 1$ of the silicone-rubber elastic layer 2 is preferably 2.5 (W/m·K) or smaller, and more preferably 2.0 (W/m·K) or smaller.

If the thermal conductivity $\lambda 1$ of the silicone-rubber elastic layer 2 is excessively small, the thermal resistance rises, and the temperature elevation on the surface layer of the tube-coated belt may be delayed. On the other hand, if the thermal conductivity $\lambda 1$ of the silicone-rubber elastic layer 2 is excessively large, the hardness may be raised, or the permanent compressive strain may become worsened.

The thermal conductivity $\lambda 1$ of the silicone-rubber elastic layer 2 can be controlled by compounding a thermal conductive imparting material, such as quartz, alumina, magnesium oxide and zinc oxide.

The examples of silicone rubber materials that can be used for forming the silicone-rubber elastic layer 2 include additive silicone rubber, DY 35-561 A/B (trade name of Dow Corning Toray Silicone Co., Ltd.), KE 109A·B (trade name of Shin-Etsu Chemical Co., Ltd.), and peroxide curing silicone rubber DY 32-903 U (trade name of Dow Corning Toray Silicone Co., Ltd.).

The quantity of the thermal conductive imparting material that can be added to these silicone-rubber materials is not specifically limited but is preferably in such a range that the value of $t1/\lambda 1$ satisfies the above relational expression (1) or (2). For example, the quantity of the above thermal conductive imparting material added to 100 parts by weight of the silicone-rubber material may be normally 50 to 350 parts by weight. The method of mixing the thermal conductive imparting material is not specifically limited, but any methods known to the art may be used for mixing.

The above silicone-rubber elastic layer may also contain a reinforcing filler such as dry silica and wet silica; and an additive such as calcium carbonate, quartz powder, zirconium silicate, clay (aluminum silicate), talc (hydrous magnesium silicate), alumina (aluminum oxide) and colcothar (iron oxide).

The silicone-rubber elastic layer can be formed using a method wherein a silicone-rubber material composition prepared by mixing a silicone-rubber material, additives and the like of a uniform thickness is overlaid on the belt-like base layer 1 using a well known method such as blade coating and ring coating, and is heat-cured; a method wherein a silicone-rubber material composition is injected into a mold and cured; a method wherein a silicone-rubber material composition is extruded, and then cured; or a method wherein a silicone-rubber material composition is injection-molded, and then cured. The conditions of coating, injecting, molding and curing are not specifically limited, but conditions suitable for the silicone-rubber material composition to be used can be selected.

(Organopolysiloxane Adhesive Composition, and Adhesive Layer)

In the present invention, the adhesive layer is preferably an adhesive layer composed of a cured product of an organopolysiloxane adhesive composition, and more preferably an adhesive layer composed of a cured product of an organopolysiloxane adhesive composition containing a specific organopolysiloxane component.

The use of an organopolysiloxane adhesive composition containing a specific organopolysiloxane component is preferable, because it excels in workability, and the formed adhesive layer has an excellent durability.

Although the types of organopolysiloxane adhesive compositions include addition reaction type, condensation reaction type and peroxide reaction type, an organopolysiloxane adhesive composition of addition reaction type, which produces no byproducts, is suited for the present invention.

It has been known that an organopolysiloxane adhesive composition of the addition reaction type generally contains (i) a diorganopolysiloxane having alkenyl groups, (ii) an organo-hydrogen polysiloxane, (iii) a platinum-based catalyst, and (iv) an organic silicon compound, which is an adhesive component, having functional groups such as epoxy and alkoxy groups in a molecule.

In an embodiment of the present invention, the adhesive layer is characterized in that an adhesive layer composed of the cured product of an organopolysiloxane composition containing:

(A) two or more organopolysiloxanes having at least two alkenyl groups in a molecule, at least one of which is a resinous organopolysiloxane represented by a general formula:

wherein R is a univalent hydrocarbon group, and X is a number between 0.65 and 1.9;

(B) an organopolysiloxane having at least two silicon-atom-bonded hydrogen atoms in a molecule;

(C) a platinum-based compound; and (D) an organic silicon compound having two or more functional groups selected from a group consisting of end unsaturated groups, end epoxy groups, silicon-atom-bonded hydrogen atoms and silicon-atom-bonded alkoxy groups. The adhesive layer is formed using the organopolysiloxane adhesive composition containing the above-described specific organopolysiloxane components.

The above-described component (A) is composed of two or more organopolysiloxanes having at least two alkenyl groups in a molecule, at least one of which is a resinous organopolysiloxane represented by the above general formula (I).

Specific examples of the alkenyl groups contained in the component (A) include alkenyl groups, such as vinyl, allyl, butenyl, pentenyl and hexenyl groups. A molecule of the component (A) may contain the same alkenyl groups or different alkenyl groups. It is preferable to use the component (A) having a viscosity of 50 to 3,000 Pa·s at 25° C.

Specific examples of organopolysiloxane used in the present invention having at least two alkenyl groups in a molecule of the component (A), other than resinous organopolysiloxane represented by the above general formula (I), are organopolysiloxanes having at least two alkenyl groups in a straight-chain, branched or cyclic molecule; however, straight-chain or branched dimethylvinylsiloxy-terminated polydimethylsiloxanes can be preferably used. Especially because of ease of viscosity control of the organopolysiloxane adhesive composition, a straight-chain dimethylvinylsiloxy-terminated polydimethylsiloxane is preferable. The organopolysiloxane having at least two alkenyl groups in a molecule of the component (A), other than resinous organopolysiloxane represented by the above general formula (I), can be manufactured using the method disclosed in Japanese Patent Application Laid-Open No. 2002-36383.

The resinous organopolysiloxane (may be referred to as (A') component) represented by the general formula:

wherein R is a univalent hydrocarbon group, and X is a number between 0.65 and 1.9, is a component for improving the mechanical strength and adhesive strength of the obtained adhesive layer.

In general, although a method of compounding a reinforcing filler such as reinforcing silica may be used to improve the strength of the adhesive layer formed using an organopolysiloxane adhesive composition, such a method raise the viscosity of the organopolysiloxane adhesive composition, and is not suitable for achieving the object of the present invention.

In the present invention, compounding the above-described resinous organopolysiloxane can improve the strength of the adhesive layer without raising the viscosity of the organopolysiloxane composition.

In the above general formula (I), R represents a univalent hydrocarbon group, and specific example of R include alkyl groups such as methyl, ethyl and propyl groups; alkenyl groups such as vinyl, allyl, butenyl, pentenyl and hexenyl groups; aryl groups such as phenyl, tolyl and xylyl groups; aralkyl groups such as benzyl and phenethyl groups; and aliphatic halogenated hydrocarbon groups such as 3-chloropropyl and 3,3,3-trifluoropropyl groups. It is preferable that at least one of Rs is an alkenyl group.

In the above general formula (I), X is a number between 0.65 and 1.9. The use of the (A') component whose X is 0.65 or larger improves the mechanical strength of the obtained adhesive layer; and the use of the resinous organopolysiloxane whose X is 1.9 or smaller as the (A') component makes the manufacture of the resinous organopolysiloxane easy, and is economically advantageous.

The value of X can be obtained using $_{29}$Si nuclear magnetic resonance ($_{29}$Si-NMR) spectrometry as the mole ratio of the $R_3SiO_{1/2}$ unit (may be referred to as M unit) to the $SiO_{4/2}$ unit (may be referred to as Q unit) in the above-described resinous organopolysiloxane.

The resinous organopolysiloxane represented by the above general formula (I) may partially have siloxane units represented the general formula, $R_2SiO_{2/2}$ (where R is the same as described above) and the general formula, $RSiO_{3/2}$ (where R is the same as described above) as optional siloxane units in the above component, as long as the object of the present invention in not impaired.

The specific examples of the (A') component that can be used in the present invention include a resinous organopolysiloxane composed of a $CH_2=CH(CH_3)_2SiO_{1/2}$ unit, a $(CH_3)_3SiO_{1/2}$ unit and a $SiO_{4/2}$ unit, wherein the mole ratio of the total quantity of the $CH_2=CH(CH_3)_2SiO_{1/2}$ unit and the $(CH_3)_3SiO_{1/2}$ unit to the $SiO_{4/2}$ unit is 1.8, having a viscosity of 0.21 Pa·s at 25° C., and containing 15 mole percent (5.6% by weight) of vinyl groups; and a resinous organopolysiloxane composed of a $CH_2=CH(CH_3)_2SiO_{1/2}$ unit, a $(CH_3)_3SiO_{1/2}$ unit and a $SiO_{4/2}$ unit, wherein the mole ratio of the total quantity of the $CH_2=CH(CH_3)_2SiO_{1/2}$ unit and the $(CH_3)_3SiO_{1/2}$ unit to the $SiO_{4/2}$ unit is 0.7, having a viscosity of 50 Pa·s, and containing 15 mole percent (5.6% by weight) of vinyl groups.

It is preferable to use the (A') component having a viscosity between 0.2 and 50 Pa·s at 25° C. The (A') component can be manufactured using the method disclosed in Japanese Patent Application Laid-Open No. 2002-36383 and the like.

The content of the (A') component is preferably 30 parts by weight or more and 60 parts by weight or less to 100 parts by weight of the (A) component. If the content of the (A') component is 30 parts by weight or more, the strength of the adhesive layer is improved, and if the content is 60 parts by weight or less, the adhesion durability of the adhesive layer is improved.

The (B) component used in the present invention is organopolysiloxane having at least two silicon-atom-bonded hydrogen atoms in a molecule.

The specific examples of the (B) component that can be used in the present invention include an organo-hydrogen polysiloxane composed of an $H(CH_3)_2SiO_{1/2}$ unit, a $(CH_3)_3SiO_{1/2}$ unit and a $SiO_{4/2}$ unit, containing 1.0% by weight of silicon-atom-bonded hydrogen atoms, and having a viscosity of 0.024 Pa·s.

It is preferable to use the (B) component having a viscosity between 0.02 and 0.03 Pa·s at 25° C. The (B) component can be manufactured using the method disclosed in Japanese Patent Application Laid-Open No. 2002-36383 and the like.

The content of the (B) component is preferably 20 parts by weight or more and 30 parts by weight or less to 100 parts by weight of the (A) component. If the content of the (B) component is 20 parts by weight or more, the strength of the cured product is improved, and if the content is 30 parts by weight or less, the workability is improved.

The (C) component of the present invention is a platinum-based compound, and specific examples that can be used include platinum-based compounds, such as chloroplatinic acid, an alcoholic solution of chloroplatinic acid, a complex of chloroplatinic acid and olefin, a complex of chloroplatinic acid and vinyl siloxane, platinum-supporting silica, and platinum-supporting activated charcoal. The (C) component can be used after dissolving in a solvent such as 2-ethylhexyl alcohol or the like.

The content of the (C) component is preferably 0.005 to 0.01 parts by weight to 100 parts by weight of the (A) component. If the content of the (C) component is 0.005 parts by weight or more, the curing properties are improved, and if the content is 0.01 parts by weight or less, the workability is improved.

The (D) component used in the present invention is an organic silicon compound having two or more functional groups selected from a group consisting of an end unsaturated group, an end epoxy group, a silicon-atom-bonded hydrogen atom, and a silicon-atom-bonded alkoxy group in a molecule, and is an adhesiveness-imparting component.

The specific examples of the (D) component that can be used in the present invention include γ-glycidoxypropyltrimethoxysilane, 3-methacryloxypropyltrimethoxysilane, an organo-pentasiloxane represented by $ViMe_2SiO(Me_2SiO)_3Si(OMe)_3$ (where Vi represents a vinyl group, and Me represents a methyl group).

The content of the (D) component is preferably 10 to 20 parts by weight to 100 parts by weight of the (A) component. If the content of the (D) component is 10 parts by weight or more, the adhesiveness is improved, and if the content is 20 parts by weight or less, the workability is improved.

The organopolysiloxane adhesive composition used in the present invention can be manufactured by batch-wise or continuously kneading the above components and other desired additives. However, the manufacturing method is not specifically limited, but for example, a suitable method can be selected from the manufacturing methods known to the art, and can be used for manufacturing.

It is preferable that the organopolysiloxane adhesive composition used in the present invention has a viscosity of 0.2 to 5 Pa·s. If the viscosity is 0.2 Pa·s or higher, the composition exhibits an excellent lubrication effect on overlaying the resin tube, and the workability is improved. If the viscosity is 5 Pa·s or lower, the adhesive layer can be easily thinned.

The thickness t2 of the adhesive layer in the present invention is preferably 1 μm or more and 10 μm or less, more preferably within a range between 3 and 8 μm. If the thickness of the adhesive layer is 1 μm or more, the adhesive layer can be uniformly formed, and workability can be improved. The evenness of the thickness is also improved, and sufficient adhesive force can be maintained. Thereby, the occurrence of disturbed images can be prevented.

When the tube-coated belt is incorporated in a heat-fixing apparatus, and used as a fixation belt, if the thickness of the adhesive layer is 10 μm or less, heat generated in the metallic layer of the belt-like base layer by the heater or electromagnetic induction can be rapidly supplied from the inside to the outer layer side. Thereby, the start-up time of the heat-fixing apparatus can be shortened. The transmission of heat energy received from the silicone-rubber elastic layer of the tube-coated belt to the surface layer (PFA tube layer) is not also delayed, and thereby, the surface temperature is quickly recovered. Therefore, when the recording material passes through the nip portion of the heat-fixing apparatus, the surface temperature of the tube-coated belt does not lower even in second and third cycles. Thereby, the fixation does not lower in the leading end and the tailing end of the recording material, and for example, the uniformity of gloss on the recording material can be improved.

<Resin Tube and Resin-Tube Layer>

The examples of resin tubes 4 include a PFA tube, an FEP tube and an EPE tube. Among these resin tubes, the PFA tube is preferable.

When the PFA tube is used, the use of a heat-shrinking PFA tube whose inner surface is defluorinated is preferable. When the PFA tube whose inner surface is defluorinated is used, adhesiveness can be improved. The examples of methods for defluorinating the inner surface include the alkali metallic sodium method wherein a THF solution of the complex of metallic sodium and naphthalene or an ammonium solution of metallic sodium is used as the treating agent. The examples of physical methods include methods utilizing glow discharge, corona discharge and electronic beams.

It is preferable that the resin tube has an inner diameter of −10% to +10% of the belt-like base layer with a silicone-rubber elastic layer. If the inner diameter is excessively small, the resin tube may be broken, or a uniform surface cannot be obtained due to plastic deformation when the belt-like base layer is coated with the resin tube. On the other hand, if the inner diameter is excessively large, wrinkles or waves are produced on the surface layer after the adhesive composition has been cured, and the images may be disordered.

The thickness t3 of the resin tube is preferably 30 μm or less. If the thickness of the resin tube is 30 μm or less, the rigidity thereof reflects the elasticity of the silicone-rubber elastic layer to the surface of the fixation belt, and sufficient flexibility can be secured. It is also preferable that the thickness of the resin tube is 10 μm or more. The thickness of the resin tube of 10 μm or more preferably improves workability.

(Sliding Layer)

Although the sliding layer 5 is not an essential component in the present invention, depending on the constitution of the fixing apparatus or the tube-coated belt, the formation of the sliding layer 5 is preferable to reduce the driving torque in operating the fixing apparatus.

The sliding layer 5 is formed on the inner surface side of the belt-like base layer. When the sliding layer 5 is formed, since heat generated in the belt-like base layer 1 can be insulated not to direct to the inside of the tube-coated belt without excessively raising the thermal capacity of the tube-coated belt, the efficiency of heat supply to the recording material side is improved compared with the case where no sliding layer 5 is present, and power consumption can be reduced. The start-up time can also be shortened.

The material of the sliding layer 5 is not specifically limited, but any materials having a high heat resistance and a high mechanical strength that can smoothen the surface can be selected. The sliding layer 5 can be preferably composed of polyimide resin or the like.

A lubricating agent may also be contained in the sliding layer as required. The examples of lubricating agents include fluorine resin powder, graphite and molybdenum disulfide.

The thickness of the sliding layer 5 is preferably 5 μm or more and typically 10 μm or more, more preferably 100 μm or less and 60 μm or less. If the sliding layer 5 is excessively thin, the durability may be poor. On the other hand, if the sliding layer 5 is excessively thick, the thermal capacity of the tube-coated belt may increase, and the start-up time may become long.

The sliding layer 5 can be formed using a method well known to the art, for example, by overlaying a liquid material known on the inner surface of a belt-like base layer, and drying and curing the liquid material; or by adhering a tubular material on the belt-like base layer.

(Heat-Fixing Apparatus)

The heat-fixing apparatus of the present invention is characterized in using the tube-coated belt, and it is preferable that the heat-fixing apparatus has a process speed exceeding 100 mm/sec, and uses the tube-coated belt having an outer diameter of up to 5 times the nip width to be formed.

In a heat-fixing apparatus of a belt fixation system, the fixation belt receives heat at the nip portion or a portion other than the nip portion, and supplies the heat to the toner and the recording material at the nip portion. In the heat-fixing apparatus of such a belt fixation system, a minimally-required heat supply time, that is the retention time of the recording material in the nip is required to satisfy a minimal fixation level. For fixation a color-toner image, the retention time in the nip exceeding about 50 msec must be secured. In a heat-fixing apparatus oriented to high-speed operation, the constitution that secures a wide nip width corresponding to the process speed is required. Therefore, in a heat-fixing apparatus having a fixation belt of a small diameter oriented to downsizing, the heat supply time is inevitably shortened. In a heat-fixing apparatus oriented to high-speed operation whose process speed exceeds 100 mm/sec, and also in a heat-fixing apparatus oriented to downsizing using a fixation belt of an outer diameter of 5 times the nip width or smaller, a sufficient thermal response can be obtained if the tube-coated belt is installed as the fixation belt. Therefore, the supply of heat received from the heat source to the surfaces of members does not delay, and the surface temperature of the members does not lower even in the second and third cycles. If the tube-coated belt of the present invention is used, fixation quality of the leading end of the recording material does not lower in the tailing end, and a heat-fixing apparatus producing high-quality images, for example, having highly uniform gloss on the recording material can be manufactured.

Next, an embodiment of the heat-fixing apparatus according to the present invention will be described.

(Heat-Fixing Apparatus 1)

The tube-coated belt of the present invention can be installed in the heat-fixing apparatus of a heater-heating system described below.

FIG. 2 is a schematic diagram showing the cross-section of the heat-fixing apparatus of an embodiment of the present invention. The heat-fixing apparatus 200 is a heat-fixing apparatus of a belt-heating system using a ceramic heater. The fixation belt 210 is the above-described tube-coated belt of the present invention used as the fixation belt. The belt having a small diameter, specifically a diameter of 35 mm or less, is selected as the fixation belt.

The belt guide 216 is a heat-resistant, heat-insulating belt guide. The ceramic heater 212 is fitted and fixed in the trench formed along the lengthwise direction of the guide in the substantial center portion of the lower surface of the belt guide 216. A cylindrical or endless fixation belt 210 is loosely fitted around the belt guide 216.

A rigid stay for pressing 222 is inserted in inside of the belt guide 216.

The pressure member 230 in this embodiment is a pressure roller having an elastic layer. The pressure member 230 is composed of an elastic layer 230b such as silicone rubber formed around the core metal 230a, and both ends of the core metal 230a are rotatably supported between front and back chassis side plates (not shown) of the heat-fixing apparatus. The lower surface of the sliding plate 240 installed on the lower surface of the ceramic heater 212 is pressure-contacted to the upper surface of the pressure roller 230 through the fixation belt 210, to form a nip portion N of a predetermined width.

The rotation of the pressure roller 230 is started based on print-start signals, and the heat-up of the ceramic heater 212 is started. When the peripheral speed of the fixation belt 210 by the rotation of the pressure roller 230 has become constant and the temperature of the ceramic heater 212 has risen to a predetermined temperature, a recording material P carrying a toner image t is introduced with the toner-image-carrying surface facing the fixation belt 210 side as a material to be heated between the fixation belt 210 and the pressure roller 230 in the nip portion N. The recording material P contacts the lower surface of the ceramic heater 212 through the fixation belt 210, and passes through the nip portion N together with the fixation belt 210. In the course of the movement, heat of the ceramic heater 212 is supplied to the recording material P through the fixation belt 210, and the toner image t is thermally fixed on the surface of the recording material P. The recording material P after passing through the nip portion N is separated from the outer surface of the fixation belt 210 and conveyed.

The ceramic heater 212 is a linear heater of a low thermal capacity having the lengthwise direction diagonal to the moving direction of the fixation belt 210 and the recording material P. The ceramic heater 212 is basically composed of a heater base plate 212a formed of aluminum nitride, for example and a heat-generating layer 212b installed on the surface of the heater base plate 212a along the lengthwise direction thereof, for example, a heat-generating layer 212b formed from an electrically resistant material such as Ag/Pd (silver/palladium) of a thickness of about 10 μm and a width of 1 to 5 mm applied by screen-printing or the like. The ceramic heater 212 may further include a protective layer of glass or fluorine resin formed thereon. However, the ceramic heater 212 is not limited to this type of ceramic heater.

In the nip portion N contacting the fixation belt 210, the surface of the sliding plate 240 of the ceramic heater 212 and the inner surface of the fixation belt 210 contact to and slide on each other. In order to secure the nip retention time of the recording paper, the nip width is changed corresponding to the process speed. When the process speed is 100 mm/sec or higher, the nip width must be 5 mm or more.

Next, another embodiment of the heat-fixing apparatus according the present invention will be described.

(Heat-Fixing Apparatus 2)

FIG. 3 is a schematic diagram showing the cross-section of the heat-fixing apparatus of another embodiment of the present invention. The heat-fixing apparatus 300 is a heat-fixing apparatus of an electromagnetic induction heating system. The fixation belt 310 is the above-described tube-coated belt of the present invention used as the fixation belt. The belt having a small diameter, specifically a diameter of 35 mm or less, is selected as the fixation belt.

A magnetic-field generating means is composed of a magnetic core 317 and an excitation coil 318. The magnetic core 317 is a high-magnetic-permeability member preferably composed of a material used in the core of transformers, such as ferrite and permalloy, and especially preferably composed of ferrite, which produces little loss even at 100 kHz or higher.

A belt-guide member 319, which is an insulating member, is disposed between the magnetic-field generating means and the fixation belt 310. The material of the belt-guide member 319 is preferably a material that excels in insulating properties and heat resistance. The alternating magnetic flux guided by the magnetic core 317 generates eddy currents in the belt-like base layer 1 (electromagnetic induction heat generating layer) composed of an electroformed nickel belt of the fixation belt 310. The eddy current generates Joule heat (eddy-current loss) in the belt-like base layer 1 by the resistivity of the belt-like base layer 1. Here, the calorific value Q is determined by the magnetic flux density passing through the belt-like base layer 1.

The temperature sensor 326 of FIG. 3 is a thermistor or the like for sensing the temperature of the fixation belt 310, and in this embodiment, the temperature of the nip portion N is controlled based on the temperature information of the fixation belt 310 measured using the temperature sensor 326.

The pressure roller 330 as a pressure member is composed of a core metal 330a and a heat-resistant elastic layer 330b of silicone rubber, fluorine rubber or fluorine resin concentrically and cylindrically formed on the peripheral portion of the core metal, and both ends of the core metal 330a are rotatably supported by bearings between front and back chassis side plates (not shown) of the apparatus.

By installing a shrunk pressure spring (not shown) between the both end portions of the rigid stay for pressing 322 and a spring-bearing member (not shown), a depressing force is given to the rigid stay for pressing 322. Thereby, the lower surface of the sliding plate 340 disposed on the lower surface of the belt-guide member 319 and the upper surface of the pressure roller 330 are pressure-contacted with the intervening fixation belt 310 to form a nip portion N of a predetermined width.

The recording material P closely contacts the outer surface of the fixation belt 310 in the nip portion N, and passes through the nip portion N together with the fixation belt 310. During this passing step, the toner image t is heated by the electromagnetic induction heat generation of the fixation belt 310, and thermally fixed on the surface of the recording material P. The nip width is changed corresponding the process speed to secure the nip retention time of the recording material P. If the process speed is 100 mm/sec or higher, the nip width must be 5 mm or more. When the recording material P passes through the nip portion N, it is separated from the outer surface of the fixation belt 310, and discharged and conveyed. After passing through the nip portion N, the thermally fixed toner image on the recording material P is cooled to become a permanently fixed image.

In this embodiment, although no oil applying mechanism for offset prevention is installed in the fixing apparatus, an oil applying mechanism may be installed when a toner containing no low softening substance is used. In the case where a toner containing a low softening substance is used, oil application or separation be cooling may be performed.

The pressure member 330 is not limited to a pressure roller, but may be a member of other forms, such as a turning film type, may be used. Further, the constitution for supplying heat energy also from the pressure member 330 side can be used, and a heat-generating means, such as an electromagnetic induction heating means, can be formed in the pressure member 330 side to raise and control the temperature as predetermined.

EXAMPLES

The present invention will be specifically described below referring to Examples and Comparative Examples; however, the present invention is not limited thereto. Unless otherwise specified, commercially available high-purity reagents and the like were used. The viscosities described herein are values measured at 25° C. using RotoVisco RV1 (trade name), a precision rotary viscometer manufactured by EKO INSTRUMENTS Co., Ltd., and the parts are indicated by parts by weight.

(Evaluation of Thermal Conductivity of Silicone-Rubber Elastic Layer)

A silicone-rubber material composition was heat-molded to prepare a plate-like test piece of a thickness of 10 mm, and the thermal conductivity thereof was measured using a quick thermal conductivity meter QTM-500 (trade name of Kyoto Electronics Manufacturing Co., Ltd.).

(Evaluation of Performance of Heat-Fixing Apparatus and Fixation Belt)

Recording materials carrying cyan toner images before fixation were passed through the above-described heat-fixing apparatus 1 wherein a tube-coated belt of an Example or a Comparative Example is installed (may be referred to as Fu-1), or a heat-fixing apparatus 2 of the electromagnetic induction heating system (may be referred to as Fu-2), and fixed; and the gloss of the fixed solid images is measured at 5 places in each of the leading-end region and the tailing-end region of the recording material, the difference in the mean value was evaluated, and the evenness and irregularity of gloss were visually observed and evaluated.

The uniformity of gloss (difference in glossiness) was evaluated using the following criteria:
OK: Difference in glossiness was 5 or below.
NG: Difference in glossiness exceeded 5.

The gloss irregularity visually observed was evaluated using the following criteria:
OK: As a result of visual observation by five testers, all of the five judged that there is little gloss irregularity.
NG: As a result of visual observation by five testers, one or more tester pointed out gloss irregularity.

The toner images before fixation were obtained by taking out the recording material on which the toner was transferred using a color-image forming apparatus (Color Laser Shot LBP-2040: trade name of Canon, Inc.) before fixation. As the recording material, the sheets of paper of a standard thickness of 82 g/m$^2$ were used for evaluation.

In the evaluation of the sample in the heat-fixing apparatus 1 (Fu-1), a pressure roller of an outer diameter of 20 mm was used, and the fixation temperature was 200° C. In the evaluation of the sample in the heat-fixing apparatus 2 (Fu-2), a pressure roller of an outer diameter of 34 mm was used, and the fixation temperature was controlled to 195° C.

For the measurement of glossiness, a gloss meter PG-3D (incident/reflection angle=75°, trade name of Nippon Denshoku Industries Co., Ltd.) was used, and black glass of a glossiness of 96.9 was used as the reference.

(Adhesion Durability of Adhesive Layer)

The tube-coated belt of an Example or a Comparative Example was installed in the above heat-fixing apparatus 1 (Fu-1), the fixation temperature was controlled to 200° C., the tube-coated belt idled, and the rotation of the belt was stopped every 50 hours and the entire surface of the belt was visually observed to check the presence of damage of the tube, such as floating and breaking, and evaluate the adhesion durability.

The adhesion durability was evaluated using the following criteria:
500H-OK: No damages were observed on the belt surface after 500 hours have lapsed.
450H-partly delaminated: Floatation of the tube was observed in the radial direction on the width of about 5 mm in the center portion of the belt after 450 hours have lapsed.

(Evaluation of Start-Up Time of Heat-Fixing Apparatus)

The tube-coated belt of an Example or a Comparative Example was installed in the fixation unit LBP-2510 (trade name of Canon, Inc.), and the start-up time (time after allowing to stand for 1 hour at 25° C., from the transmission of print signals to the completion of printing) was measured.

(Evaluation of Adhesion Durability)

A paper-passing test for 100,000 sheets of paper was conducted using the apparatus used in the above evaluation of start-up time. For the tube-coated belt before and after the paper-passing test for 100,000 sheets of paper, the delamination test of the silicone-rubber elastic layer and the surface layer of the PFA tube wad conducted to obtain the lowering rate of the adhesive strength, and adhesion durability was evaluated.

For the delamination test, two slits are formed in the circumferential direction of the tube-coated belt at an interval of 10 mm, a part of the PFA surface layer is pulled and delaminated, and the part is clamped in a tensile tester to perform 90° delamination test.

(Evaluation of Workability)

The base layer is held in the state wherein a silicone-rubber elastic layer was formed on a metallic core material having an inner diameter substantially identical to the inner diameter of the belt, and the organopolysiloxane adhesive composition was thinly and substantially evenly applied onto the surface of the a silicone-rubber elastic layer. On the other hand, in the state wherein an end of the PFA tube was held, the other end was spread, and the ease of overlaying the PFA tube from an end of the belt-like base layer on which the silicone-rubber elastic layer was formed through the organopolysiloxane adhesive composition was evaluated as the workability.

The workability was evaluated using the following criteria:
AA: When no elongation or wrinkles occurred due to the effect of tension produced in the tube when 10 PFA tubes were overlaid under substantially same conditions.
A: When elongation or wrinkles occurred in one or two tubes when 10 PFA tubes were overlaid in the same manner.

Examples 1 to 24

An electroformed nickel endless belts having inner diameters of 24 mm and 30 mm and a thickness of 35 μm shown in Table 1 was used as belt-like base layers; and a silicone-rubber material composition obtained by compounding and kneading the quantities shown in Table 1 of magnesium oxide (pyrokisuma 3320, trade name of Kyowa Chemical Industry Co., Ltd.) as a thermal conductivity imparting agent in 100 parts by weight (solid content) of an additive silicone rubber (DY35-561A/B, trade name of Dow Corning Toray Sillicone Co., Ltd.) was used as a silicone-rubber material composition for forming silicone-rubber elastic layers. This silicone-rubber material composition was applied to the belt-like base layer using a ring coating method, and cured to form silicone-rubber elastic layers.

FIG. 4 is a schematic diagram of the ring coat method. A coating table 442 capable of horizontally and pivotally rotating an aluminum cylinder holding tool 411 having a belt-like base layer 441 mounted on the outer face is provided on a substrate. Further, a coating head holding section 444, which does not move horizontally, and movably holds a ring-shaped coating head 431 on the central axis vertical plane of the cylinder holding tool, is mounted on the substrate. This coating head 431 has at the end of the moving direction an inner diameter almost equal to the outer diameter of the belt after coating, and has at the front thereof a guide portion contacting the outer face of the belt-like base layer and making the belt-like base layer relatively move coaxially with the axis of the cylinder holding tool along the axis of the cylinder holding tool. The cross-sectional area of the coating solution passage portion of this guide portion is larger than the cross-sectional area of the coating film, so that a coating solution can be sufficiently supplied to the end of the moving direction of the coating head having an inner diameter almost equal to the outer diameter of the belt-shaped base layer after coating.

A supply port for supplying a coating solution to the gap portion between the coating head 431 and the belt-shaped base layer 441 on the cylinder holding tool may be integral with the coating head, or may be a separate member, but the supply port described in FIG. 4 is provided at the front in the coating head moving direction as a coating solution supplying nozzle 445 that is a separate member. The position at which the coating solution is supplied is not limited to above the cylinder as long as liquid drop never occurs in association with the viscosity of the coating solution and the coating thickness. In this Example, a silicone rubber raw material composition (may be referred to as coating solution) was supplied from above the cylinder holding tool 411, and a fixed amount was supplied per hour to perform coating.

The coating solution supplying nozzle 445 is connected to a motorized cylinder pump 447 capable of discharging a fixed amount (per hour) by a tube 446 for delivering a coating solution, and therefrom the coating solution 448 is supplied. The cylinder pump can stably discharge the coating solution because pulsation of liquid does not occur.

The silicone-rubber material composition (coating solution) was applied onto the outer surface of the belt-like base layer using the above-described ring-coating apparatus, and was heat-cured to form a silicone-rubber elastic layer having a desired thickness.

In the heating step, the belt-like base layer was rotated at a rotation speed of 10 rpm to prevent the sag of the coating solution. In the heat-curing step, the coated surface was heated to about 200° C. using a near-infrared lamp installed substantially parallel to the belt-like base layer, and heat-cured for 20 minutes.

Next, as the (A) component, 55 parts of dimethylvinylsiloxy-terminated polydimethylsiloxane having a viscosity of 3,000 Pa·s at 25° C., and 45 parts of a resinous organopolysiloxane composed of a $CH_2=CH(CH_3)_2SiO_{1/2}$ unit, a $(CH_3)_3SiO_{1/2}$ unit and a $SiO_{4/2}$ unit, wherein the mole ratio of the total quantity of the $CH_2=CH(CH_3)_2SiO_{1/2}$ unit and the $(CH_3)_3SiO_{1/2}$ unit to the $SiO_{4/2}$ unit is 1.8, having a viscosity of 0.21 Pa·s at 25° C., and containing 15 mole percent (5.6% by weight) of vinyl groups ((A') component); as the (B) component, 30 parts of an organo-hydrogen polysiloxane composed of an $H(CH_3)_2SiO_{1/2}$ unit, a $(CH_3)_3SiO_{1/2}$ unit and a $SiO_{4/2}$ unit, containing 1.0% by weight of silicon-atom-bonded hydrogen atoms, and having a viscosity of 0.024 Pa·s at 25° C.; as the (C) component, 0.4 parts of a 2-ethylhexyl alcohol solution of chloroplatinic acid (containing 2% by weight of platinum); and as the (D) component, 15 parts of 3-methacryloxypropyltrimethoxysilane were sequentially weighed, mixed and agitated using a universal mixing agitator manufactured by Dalton Corporation to prepare an organopolysiloxane adhesive composition. The viscosity of the obtained organopolysiloxane adhesive composition was 4.0 Pa·s at 25° C.

The above-described silicone-rubber elastic layer was coated with this organopolysiloxane adhesive composition, and a PFA tube defluorinated using an alkali metallic sodium method having a thickness of 20 μm was overlaid and cured to form an adhesive layer.

Next, a polyimide varnish (U-Varnish S: trade name of UBE Industries, Ltd.) was applied onto the inner surface of the belt-like base layer by dipping method, dried for 30 minutes using a hot-air-circulating drier at 200° C., and further heated for 30 minutes at a temperature elevated to 250° C. to form a sliding layer composed of polyimide having a thickness of 15 μm, and to obtain a tube-coated belt.

The data on obtained tube-coated belts are tabulated in Table 1.

TABLE 1

| | Belt-like base layer | | Silicone-rubber elastic layer | | | | Adhesive layer |
|---|---|---|---|---|---|---|---|
| | Inner diameter (mm) | Thickness (μm) | Added MgO quantity (parts) | λ1 (W/m · K) | Thickness t1 (μm) | t1/λ1 (μm · m · K/W) | Thickness t2 (μm) |
| Example 1 | 24 | 35 | 310 | 1.98 | 450 | 227 | 5 |
| Example 2 | 24 | 35 | 270 | 1.48 | 300 | 203 | 5 |
| Example 3 | 24 | 35 | 230 | 1.20 | 250 | 208 | 5 |
| Example 4 | 24 | 35 | 230 | 1.20 | 450 | 375 | 5 |
| Example 5 | 24 | 35 | 210 | 1.02 | 300 | 294 | 5 |
| Example 6 | 24 | 35 | 180 | 0.84 | 250 | 298 | 5 |
| Example 7 | 24 | 35 | 180 | 0.84 | 350 | 417 | 5 |
| Example 8 | 24 | 35 | 125 | 0.63 | 250 | 397 | 5 |
| Example 9 | 24 | 35 | 125 | 0.63 | 400 | 635 | 5 |
| Example 10 | 24 | 35 | 70 | 0.40 | 250 | 625 | 5 |
| Example 11 | 24 | 35 | 210 | 1.02 | 300 | 294 | 10 |
| Example 12 | 24 | 35 | 180 | 0.84 | 350 | 417 | 8 |
| Example 13 | 24 | 35 | 100 | 0.50 | 300 | 600 | 3 |
| Example 14 | 24 | 35 | 210 | 1.02 | 300 | 294 | 1 |
| Example 15 | 24 | 35 | 310 | 1.98 | 300 | 152 | 5 |
| Example 16 | 24 | 35 | 270 | 1.48 | 250 | 169 | 5 |
| Example 17 | 24 | 35 | 100 | 0.50 | 450 | 900 | 5 |
| Example 18 | 24 | 35 | 25 | 0.30 | 300 | 1000 | 5 |
| Example 19 | 24 | 35 | 5 | 0.22 | 200 | 909 | 5 |
| Example 20 | 24 | 35 | 125 | 0.63 | 250 | 397 | 20 |
| Example 21 | 24 | 35 | 100 | 0.50 | 300 | 600 | 12 |
| Example 22 | 30 | 35 | 180 | 0.84 | 300 | 357 | 8 |
| Example 23 | 30 | 35 | 125 | 0.63 | 200 | 317 | 5 |
| Example 24 | 30 | 35 | 160 | 0.74 | 250 | 338 | 3 |

Since an organopolysiloxane adhesive composition having a viscosity exceeding 5 Pa·s was used in the adhesive layers of the tube-coated belts of Examples 20 and 21, the thickness of the adhesive layers could not be controlled to 10 μm or less. These were not in the best mode in terms of image quality as described later; however, although these were inferior to the tube-coated belts of Examples 1 to 14, these were still on a practicable level.

Although the thickness of the adhesive layer of the tube-coated belt of Example 14 was controlled to 1 μm, the thickness of the adhesive layer could not be uniformly controlled if the thickness of the adhesive layer was less than 1 μm, and poor adhesion was observed.

The obtained tube-coated belts were incorporated in heat-fixing apparatuses, and the tube-coated belts used as the fixation belts of heat-fixing apparatuses were evaluated. The results of evaluation are shown in Table 2.

TABLE 2

| Fixation belt | Heat-fixing apparatus | Process speed (mm/s) | Nip width (mm) | (Belt diameter/ nip width) | Gloss evenness (gloss difference) | Gloss unevenness (visual observation) |
|---|---|---|---|---|---|---|
| Example 1 | Fs-1 | 120 | 6 | 4.0 | OK (0) | OK |
| Example 2 | Fs-1 | 120 | 6 | 4.0 | OK (0) | OK |
| Example 3 | Fs-1 | 120 | 6 | 4.0 | OK (0) | OK |
| Example 4 | Fs-1 | 120 | 6 | 4.0 | OK (0) | OK |
| Example 5 | Fs-1 | 120 | 6 | 4.0 | OK (0) | OK |
| Example 6 | Fs-1 | 120 | 6 | 4.0 | OK (0) | OK |
| Example 7 | Fs-1 | 120 | 6 | 4.0 | OK (0) | OK |
| Example 8 | Fs-1 | 120 | 6 | 4.0 | OK (0) | OK |
| Example 9 | Fs-1 | 120 | 6 | 4.0 | OK (3) | OK |
| Example 10 | Fs-1 | 120 | 6 | 4.0 | OK (3) | OK |
| Example 11 | Fs-1 | 120 | 6 | 4.0 | OK (2) | OK |
| Example 12 | Fs-1 | 120 | 6 | 4.0 | OK (0) | OK |
| Example 13 | Fs-1 | 120 | 6 | 4.0 | OK (1) | OK |
| Example 14 | Fs-1 | 120 | 6 | 4.0 | OK (0) | OK |
| Example 15 | Fs-1 | 120 | 6 | 4.0 | OK (0) | NG |
| Example 16 | Fs-1 | 120 | 6 | 4.0 | OK (0) | NG |
| Example 17 | Fs-1 | 120 | 6 | 4.0 | NG (6) | OK |
| Example 18 | Fs-1 | 120 | 6 | 4.0 | NG (7) | OK |
| Example 19 | Fs-1 | 120 | 6 | 4.0 | NG (6) | OK |
| Example 20 | Fs-1 | 120 | 6 | 4.0 | NG (10) | OK |
| Example 21 | Fs-1 | 120 | 6 | 4.0 | NG (6) | OK |
| Example 22 | Fs-2 | 150 | 9.5 | 3.2 | OK (0) | OK |
| Example 23 | Fs-2 | 150 | 9.5 | 3.2 | OK (0) | OK |
| Example 24 | Fs-2 | 150 | 9.5 | 3.2 | OK (0) | OK |

In a heat-fixing apparatus 1 (Fu-1) of which the process speed was set to a level greater than 100 mm/sec, the fixed solid image had no difference in gloss between leading and rear ends, and no gloss unevenness as caused by insufficient surface flexibility, resulting in a good image, in the case of the tube-coated belts of Examples 1 to 8 and Examples 12 and 14. The tube-coated belt of Example 12, in particular, had a somewhat thicker adhesive layer than those of Examples 1 to 8, but provided a comparatively good image.

In the case of the tube-coated belts of Examples 9, 10 and 13, the value of $t1/\lambda1$ of the silicone rubber elastic layer was large compared to those of the tube-coated belts of Examples 1 to 8, and the obtained solid image had a slight difference in gloss between leading and rear ends, but it was not significant from a practical point of view.

In the case of the tube-coated belt of Example 11, the value of $t1/\lambda1$ of the silicone rubber elastic layer was comparable with those of the tube-coated belts of Examples 1 to 8, but the thickness of the adhesive layer was slightly larger, and the obtained solid image had a slight difference in gloss between leading and rear ends. However, the difference in gloss was not significant from a practical point of view.

For the tube-coated belts of Examples 15 and 16, the value of $t1/\lambda1$ of the silicone rubber elastic layer is sufficiently small and the thickness of the adhesive layer is also small, resulting in a good heat responsiveness and a good gloss evenness of the solid image as in the case of Examples 1 to 14, but the hardness of the silicone rubber elastic layer is high compared to the thickness of the silicone rubber elastic layer, and therefore Examples 1 to 14 have better results as to gloss unevenness ascribable to insufficient surface flexibility.

In the tube-coated belts of Examples 17 to 19, good results are presented as to gloss unevenness, but when compared to Examples 1 to 14, the value of $t1/\lambda1$ is large and thus the heat responsiveness is poor and therefore, in the fixed solid image, reduction in gloss at the rear end compared to the leading end is more significant than Examples 1 to 14, and Examples 1 to 14 have better results as to the evenness of gloss.

In the case of the tube-coated belts of Examples 20 and 21, the value of $t1/\lambda1$ of the silicone elastic layer is sufficiently small, but when compared to Examples 1 to 14, the thickness of the adhesive layer is large, the difference in gloss between leading and rear ends of the obtained solid image is more significant than Examples 1 to 14, and Examples 1 to 14 have better results as to unevenness of gloss.

Further, for evaluating the adhesion durability of the adhesive layer, the above durability tests were conducted for the tube-coated belts of Examples 10 to 14. The obtained results are shown in Table 3.

TABLE 3

| Fixation belt | Heat-fixing apparatus | Process speed (mm/s) | Nip width (mm) | (Belt diameter/ nip width) | Adhesion durability of adhesive layer |
|---|---|---|---|---|---|
| Example 10 | Fs-1 | 120 | 6 | 4.0 | 500 H - OK |
| Example 11 | Fs-1 | 120 | 6 | 4.0 | 500 H - OK |
| Example 12 | Fs-1 | 120 | 6 | 4.0 | 500 H - OK |
| Example 13 | Fs-1 | 120 | 6 | 4.0 | 500 H - OK |
| Example 14 | Fs-1 | 120 | 6 | 4.0 | 450 H - Partly delaminated |

In the case of the tube-coated belts of Examples 10 to 13, they were all sufficiently adhered even after the durability test conducted for 500 hours, but for the tube-coated belt of Example 14, the surface layer was lifted at the center after the durability test conducted for 450 hours. It is not significant from a practical point of view, but it is presumed that there is a slight difference in adhesion durability because the adhesive layer is thin.

Similarly, in a heat-fixing apparatus 2 (Fu-2) of which the process speed was set to a level greater than 100 mm/s, in a case of the fixation belts of Examples 22 to 24, the value of $t1/\lambda1$ and the thickness of the adhesive layer were sufficiently small, and the obtained fixed solid image was satisfactory with no difference in gloss between leading and rear ends.

Example 25

A nickel electrocast belt having an inner diameter of 34 mm and a thickness of 50 μm was used as a belt-shaped base layer, and a silicone rubber raw material composition similar to that of Example 1 was used as a silicone rubber raw material composition for formation of a silicone rubber elastic layer. This silicone rubber raw material composition was coated on the belt-shaped base layer using the ring coat method, and thermally cured at 200° C. for 4 hours to form a silicone rubber elastic layer having a thickness of 300 μm.

Next, an organopolysiloxane adhesive composition (Ad1) was prepared in the same manner as in Examples 1 to 24. It comprised 50 parts of a polydimethylsiloxane with a dimethyl vinyl siloxy terminal, having a viscosity of 3000 Pa·s (sometimes referred to as a11) as Component (A); 50 parts of a resinous organopolysiloxane comprising a $CH_2$=CH$(CH_3)_2 SiO_{1/2}$, $(CH_3)_3 SiO_{1/2}$ and $SiO_{4/2}$ units, molar ratio of the $CH_2$=CH$(CH_3)_2 SiO_{1/2}$ and $(CH_3)_3 SiO_{1/2}$ units totaled to the $SiO_{4/2}$ unit being 1.8, having a viscosity of 0.21 Pa·s and containing vinyl group at 15% by mol (5.6% by weight) (sometimes referred to as a21); 30 parts of an organo-hydrogen polysiloxane comprising a $H(CH_3)_2 SiO_{1/2}$, $(CH_3)_3 SiO_{1/2}$ and $SiO_{4/2}$ units, containing hydrogen atom bound to silicon atom at 1.0% by weight and having a viscosity of 0.024 Pa·s (sometimes referred to as b) as Component (B); 0.4 parts of a 2-ethylhexyl alcohol solution of chloroplatinic acid (containing platinum at 2% by weight) (sometimes referred to as c) as Component (C); and 15 parts of an organo-pentasiloxane (sometimes referred to as d1), represented by $ViMe_2 SiO(Me_2 SiO)_3 Si(OMe)_3$ (where, Vi is vinyl group) as Component (D). The resulting organopolysiloxane adhesive composition (Ad1) had a viscosity of 2.9 Pa·s. The results are shown in Table 4.

A tube-coated belt (B1), shown in Table 5 was formed using this organopolysiloxane adhesive composition in the same manner as in Examples 1 to 17. It was evaluated for the above-described items. The results are given also in Table 5.

Example 26

An organopolysiloxane adhesive composition (Ad2) was prepared in the same manner as in Example 25, except that 60 parts of a polydimethylsiloxane with a dimethyl vinyl siloxy terminal, having a viscosity of 900 Pa·s (sometimes referred to as a12) as Component (A); 40 parts of a resinous organopolysiloxane (sometimes referred to as a21); and 15 parts of γ-glycidoxy propyl trimethoxy silane (sometimes referred to as d2) as Component (D). The resulting organopolysiloxane adhesive composition (Ad2) is shown in Table 4.

It was formed into a tube-coated belt (B2), shown in Table 5, in the same manner as in Example 25 to evaluate its properties. The results are given also in Table 5.

The organopolysiloxane adhesive composition had a viscosity of 3.4 Pa·s.

Example 27

An organopolysiloxane adhesive composition (Ad3) was prepared in the same manner as in Example 25, except that 60 parts of a polydimethylsiloxane with a dimethyl vinyl siloxy terminal (a11) as Component (A); and 40 parts of a resinous organopolysiloxane (a21) were used. The resulting organopolysiloxane adhesive composition (Ad3) is shown in Table 4.

It was formed into a tube-coated belt (B3), shown in Table 5, in the same manner as in Example 25 to evaluate its properties. The results are given also in Table 5.

The organopolysiloxane adhesive composition had a viscosity of 5.6 Pa·s.

Example 28

An organopolysiloxane adhesive composition (Ad4) was prepared in the same manner as in Example 25, except that 70 parts of a polydimethylsiloxane with a dimethyl vinyl siloxy terminal, having a viscosity of 50 Pa·s (sometimes referred to as a13) as Component (A); 30 parts of a resinous organopolysiloxane comprising $CH_2$=CH$(CH_3)_2 SiO_{1/2}$, $(CH_3)_3 SiO_{1/2}$ and $SiO_{4/2}$ units, molar ratio of the $CH_2$=CH$(CH_3)_2 SiO_{1/2}$ and $(CH_3)_3 SiO_{1/2}$ totaled to the $SiO_{4/2}$ unit being 0.7, having a viscosity of 50 Pa·s and containing vinyl group at 15% by mol (5.6% by weight) (sometimes referred to as a22); and 15 parts of 3-(methacryloxypropyl)-trimethoxysilane (sometimes referred to as d3) as Component (D) were used. The resulting organopolysiloxane adhesive composition (Ad4) is shown in Table 4.

It was formed into a tube-coated belt (B4), shown in Table 5, in the same manner as in Example 25 to evaluate its properties. The results are given also in Table 5.

The organopolysiloxane adhesive composition had a viscosity of 4.7 Pa·s.

Example 29

An organopolysiloxane adhesive composition (Ad5) was prepared in the same manner as in Example 25, except that 40 parts of a polydimethylsiloxane with a dimethyl vinyl siloxy terminal (a13) as Component (A); 60 parts of a resinous organopolysiloxane (a22); and 15 parts of 3-(methacryloxypropyl)-trimethoxysilane (d3) as Component (D) were used. The resulting organopolysiloxane adhesive composition (Ad5) is shown in Table 4.

It was formed into a tube-coated belt (B5), shown in Table 5, in the same manner as in Example 25 to evaluate its properties. The results are given also in Table 5.

The organopolysiloxane adhesive composition had a viscosity of 4.7 Pa·s.

Comparative Example 1

An organopolysiloxane adhesive composition (Ad6) was prepared in the same manner as in Example 25, except that 100 parts of a polydimethylsiloxane with a dimethyl vinyl siloxy terminal, having a viscosity of 50 Pa·s (sometimes referred to as a13) as Component (A) were used. The resulting organopolysiloxane adhesive composition is shown in Table 4.

It was formed into a tube-coated belt (B6), shown in Table 5, in the same manner as in Example 25 to evaluate its properties. The results are given also in Table 5.

The organopolysiloxane adhesive composition had a viscosity of 4.7 Pa·s.

Comparative Example 2

An organopolysiloxane adhesive composition (Ad7) was prepared in the same manner as in Example 25, except that 100 parts of a polydimethylsiloxane with a dimethyl vinyl siloxy terminal, having a viscosity of 900 Pa·s (sometimes referred to as a12) as Component (A) were used. The resulting organopolysiloxane adhesive composition is shown in Table 4.

An attempt made to form the organopolysiloxane adhesive composition into a tube-coated belt (B7) in the same manner as in Example 25 failed, because the composition was too viscous and caused cracking of the tube, while it was pressed thereinto.

The organopolysiloxane adhesive composition had a viscosity of 34 Pa·s.

TABLE 4

| Adhesive composition | | Component | | | | | Viscosity (Pa·s) |
|---|---|---|---|---|---|---|---|
| | | | (A) | (B) | (C) | (D) | |
| Example 25 | Ad 1 | Component Quantity (parts) | a11 50 | a21 50 | b 30 | c 0.4 | d1 15 | 2.9 |
| Example 26 | Ad 2 | Component Quantity (parts) | a12 60 | a21 40 | b 30 | c 0.4 | d2 15 | 3.4 |
| Example 27 | Ad 3 | Component Quantity (parts) | a11 60 | a21 40 | b 30 | c 0.4 | d1 15 | 5.6 |
| Example 28 | Ad 4 | Component Quantity (parts) | a13 70 | a22 30 | b 30 | c 0.4 | d3 15 | 4.7 |
| Example 29 | Ad 5 | Component Quantity (parts) | a13 40 | a22 60 | b 30 | c 0.4 | d3 15 | 4.7 |
| Comparative Example 1 | Ad 6 | Component Quantity (parts) | a13 100 | | b 30 | c 0.4 | d1 15 | 4.7 |
| Comparative Example 2 | Ad 7 | Component Quantity (parts) | a12 100 | | b 30 | c 0.4 | d1 15 | 34 |

TABLE 5

| — | Belt | Workability | Thickness of adhesive layer (μm) | Starting time (sec) | Paper passing test | Decreasing rate of adhesive strength (%) |
|---|---|---|---|---|---|---|
| Example 25 | B1 | AA | 7 | 17 | 100,000 sheets OK | 13 |
| Example 26 | B2 | AA | 8 | 20 | 100,000 sheets OK | 16 |
| Example 27 | B3 | A | 15 | 28 | 100,000 sheets OK | 8 |
| Example 28 | B4 | AA | 12 | 26 | 100,000 sheets OK | 39 |
| Example 29 | B5 | AA | 11 | 25 | 100,000 sheets OK | 48 |
| Comparative Example 1 | B6 | AA | 10 | 25 | Delaminated at 20,000 sheets | |
| Comparative Example 2 | B7 | | | | | |

This application claims priority from Japanese Patent Application No. 2003-328150 filed Sep. 19, 2003, which is hereby incorporated by reference herein.

What is claimed is:

1. A tube-coated flexible belt for a heat-fixing apparatus, the belt comprising a base layer, a silicone-rubber elastic layer, and an adhesive layer and a fluorine resin tube, the fluorine resin tube being adhered to the silicone-rubber elastic layer with the adhesive layer, wherein said adhesive layer is composed of a cured product of an organopolysiloxane adhesive composition comprising:

(A) polydimethylsiloxane having alkenyl groups at both terminals thereof and having a viscosity from 900 Pa·s to 3000 Pa·s at 25° C.;

(A') an organopolysiloxane represented by the general formula (I):

$$(R_3SiO_{1/2})_x(SiO_{4/2})_{1.0} \qquad (I)$$

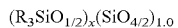

wherein R is a univalent hydrocarbon group, and X is a number between 0.65 and 1.9, and wherein said organopolysiloxane has at least two alkenyl groups in a molecule;

(B) an organopolysiloxane having at least two silicon-atom-bonding hydrogen atoms in a molecule;

(C) a platinum-based compound; and (D) an organic silicon compound having a silicon-atom-bonding alkoxy group and at least one selected from the group consisting of an end unsaturated group, an end epoxy group, and a silicon-atom-bonding hydrogen atom in a molecule, wherein the adhesive layer is from 1 μm to 10 μm in thickness and the adhesive layer is formed by curing the organopolysiloxane adhesive composition having a viscosity from 0.2 Pa·s to 5.0 Pa·s at 25° C., and wherein the belt has sufficient flexibility to prevent delamination thereof in the heat fixing apparatus after cycling for at least 100,000 sheets.

2. The tube-coated belt according to claim 1, wherein the content of said resinous organopolysiloxane is 30 parts by weight or more and 60 parts by weight or less when the content of said component (A) is 100 parts by weight.

3. The tube-coated belt according to claim 1, wherein said silicone-rubber elastic layer satisfies the following relational expression (1):

$$200 \, (\mu m \cdot m \cdot K/W) \leq t1/\lambda 1 \leq 650 \, (\mu m \cdot m \cdot K/W) \qquad (1)$$

where t1 (μm) is the thickness of said silicone-rubber elastic layer, and λ1 (W/(m·K)) is the thermal conductivity of said silicone-rubber elastic layer; and λ1 (W/(m·K)) is the thermal conductivity of said silicone-rubber elastic layer.

4. The tube-coated belt according to claim 3, wherein said silicone-rubber elastic layer satisfies the following relational expression (2):

$$200 \, (\mu m \cdot m \cdot K/W) \leq t1/\lambda 1 \leq 420 \, (\mu m \cdot m \cdot K/W) \qquad (2).$$

5. The tube-coated belt according to claim 1, wherein said base layer on which said silicone-rubber elastic layer has been formed is a metal belt having a thickness of 20 to 60 μm.

6. The tube-coated belt according to claim 1, wherein the thickness of said fluorine resin tube t3 (μm) is 10 μm or more and 30 μm or less; and the thickness of said silicone-rubber elastic layer t1 (μm) is 200 μm or more.

7. The tube-coated belt according to claim 1, wherein said base layer is an electroformed nickel belt.

8. The tube-coated belt according to claim 1, wherein said fluorine resin tube is a PFA tube.

9. A heat-fixing apparatus comprising a fixation belt, a pressure roller and a heater for heating the fixation belt, said fixation belt and pressure roller being pressure-contacted to form a nip therebetween, wherein the fixation belt is the tube-coated belt according to claim 1.

10. The heat-fixing apparatus according to claim 9, wherein said heat-fixing apparatus is a heat-fixing apparatus that has a process speed exceeding 100 mm/sec, and said resin tube of said tube-coated belt has an outer diameter of five times or less the nip width formed by said tube-coated belt.

11. A tube-coated flexible belt providing enhanced glossiness of fixed images, resisting delamination, compatible with heat fixing and providing workability, the belt comprising: a base layer, a silicone-rubber elastic layer, and an adhesive layer and a fluorine resin tube, the fluorine resin tube being adhered to the silicone-rubber elastic layer with the adhesive layer, wherein said adhesive layer is composed of a cured product of an organopolysiloxane adhesive composition comprising:
   (A) polydimethylsiloxane having alkenyl groups at both terminals thereof and having a viscosity from 900 Pa·s to 3000 Pa·s at 25° C.;
   (A') an organopolysiloxane represented by the general formula (I):

$(R_3SiO_{1/2})_x(SiO_{4/2})_{1.0}$ (I)

wherein R is a univalent hydrocarbon group, and X is a number between 0.65 and 1.9, and wherein said organopolysiloxane has at least two alkenyl groups in a molecule;
   (B) an organopolysiloxane having at least two silicon-atom-bonding hydrogen atoms in a molecule;
   (C) a platinum-based compound; and
   (D) an organic silicon compound having a silicon-atom-bonding alkoxy group and at least one selected from the group consisting of an end unsaturated group, an end epoxy group, and a silicon-atom-bonding hydrogen atom in a molecule,
   wherein the adhesive layer is from 1 μm to 10 μm in thickness and the adhesive layer is formed by curing the organopolysiloxane adhesive composition having a viscosity from 0.2 Pa·s to 5.0 Pa·s at 25° C., and
   wherein the belt has sufficient flexibility to prevent delamination thereof in the heat fixing apparatus after cycling for at least 100,000 sheets.

12. The tube-coated belt according to claim 1, wherein said organic silicon compound is a compound selected from the group consisting of γ-glycidoxypropyltrimethoxysilane, 3-methacryloxypropyltrimethoxysilane, and an organopentasiloxane represented by the following formula:

ViMe$_2$(Me$_2$SiO)$_3$Si(OMe)$_3$ wherein Vi represents a vinyl group and Me represents a methyl group.

13. The tube-coated belt according to claim 12, wherein said organic silicon compound is 3-methacryloxypropyltrimethoxysilane.

14. A process of producing a tube-coated flexible belt having sufficient flexibility to prevent delamination thereof in a heat fixing apparatus comprising the steps of:
   (i) providing an organopolysiloxane adhesive composition comprising:
      (A) polydimethylsiloxane with a dimethyl vinyl siloxy terminal and having a viscosity from 900 Pa·s to 3000 Pa·s at 25° C.;
      (A') an organopolysiloxane represented by the general formula (I):

$(R_3SiO_{1/2})_x(SiO_{4/2})_{1.0}$ (I)

wherein R is a univalent hydrocarbon group, and x is a number between 0.65 and 1.9, and wherein said organopolysiloxane has at least two alkenyl groups in a molecule;
      (B) an organopolysiloxane having at least two silicon-atom-bonding hydrogen atoms in a molecule;
      (C) a platinum-based compound; and
      (D) an organic silicon compound having a silicon-atom-bonding alkoxy group and at least one selected from the group consisting of an end unsaturated group, an end epoxy group and a silicon-atom-bonding hydrogen atom in a molecule, wherein the organopolysiloxane adhesive composition has a viscosity from 0.2 Pa·s to 5.0 Pa·s at 25° C.;
   (ii) providing a base layer on which a silicone-rubber elastic layer is formed;
   (iii) providing a fluorine resin tube whose inner surface is defluorinated;
   (iv) coating said organopolysiloxane adhesive composition on the surface of said silicone-rubber elastic layer;
   (v) overlaying said fluorine resin tube on said organopolysiloxane adhesive composition coated on said silicone-rubber elastic layer in said step (iv); and
   (vi) curing said organopolysiloxane adhesive composition to form an adhesive layer having a thickness from 1 μm to 10 μm, and adhering said fluorine resin tube to said silicone-rubber elastic layer with said adhesive layer.

15. A tube-coated flexible belt for a heat-fixing apparatus, the belt comprising a base layer, a silicone-rubber elastic layer, and an adhesive layer and a fluorine resin tube, the fluorine resin tube being adhered to the silicone-rubber elastic layer with the adhesive layer, wherein said adhesive layer is composed of a cured product of an organopolysiloxane adhesive composition comprising:
   (A) polydimethylsiloxane having alkenyl groups at both terminals thereof and having a viscosity from 900 Pa·s to 3000 Pa·s at 25° C.;
   (A') an organopolysiloxane represented by the general formula (I):

$(R_3SiO_{1/2})_x(SiO_{4/2})_{1.0}$ (I)

wherein R is a univalent hydrocarbon group, and X is a number between 0.65 and 1.9, and wherein said organopolysiloxane has at least two alkenyl groups in a molecule;
   (B) an organopolysiloxane having at least two silicon-atom-bonding hydrogen atoms in a molecule;
   (C) a platinum-based compound; and
   (D) an organic silicon compound having a silicon-atom-bonding alkoxy group and at least one selected from the group consisting of an end unsaturated group, an end epoxy group, and a silicon-atom-bonding hydrogen atom in a molecule, wherein the adhesive layer is from 1 μm to 10 μm in thickness and the adhesive layer is formed by curing the organopolysiloxane adhesive composition having a viscosity from 0.2 Pa·s to 5.0 Pa·s at 25° C., and wherein the belt has sufficient flexibility to deform at a nip between the belt and a pressure roll.

16. The tube-coated belt according to claim 15, wherein said organic silicon compound is a compound selected from the group consisting of γ-glycidoxypropyltrimethoxysilane, 3-methacryloxypropyltrimethoxysilane, and an organopentasiloxane represented by the following formula:

ViMe$_2$(Me$_2$SiO)$_3$Si(OMe)$_3$ wherein Vi represents a vinyl group and Me represents a methyl group.

17. The tube-coated belt according to claim 16, wherein said organic silicon compound is 3-methacryloxypropyltrimethoxysilane.

* * * * *